United States Patent [19]

Negishi et al.

[11] Patent Number: 5,752,086
[45] Date of Patent: May 12, 1998

[54] LENS-FITTED PHOTO FILM UNIT WITH SUPPORTED FILM ADVANCE WHEEL

[75] Inventors: Kenji Negishi; Osamu Noguchi; Kazuo Okoyama, all of Kanagawa, Japan

[73] Assignee: Fuji Photo Film Co., Ltd., Kanagawa, Japan

[21] Appl. No.: 808,164

[22] Filed: Feb. 28, 1997

[30] Foreign Application Priority Data

Mar. 1, 1996 [JP] Japan .................. 8-045019

[51] Int. Cl.$^6$ ...................................... G03B 17/02
[52] U.S. Cl. ...................... 396/6; 396/411; 396/535
[58] Field of Search ......................... 396/6, 411, 513, 396/516, 535, 538

[56] References Cited

U.S. PATENT DOCUMENTS

| | | | |
|---|---|---|---|
| 4,978,985 | 12/1990 | Smart et al. | 396/515 |
| 5,452,036 | 9/1995 | Kamata | 396/512 |
| 5,530,502 | 6/1996 | Petruchik | 396/411 |
| 5,602,604 | 2/1997 | SanGregory | 396/6 |
| 5,617,169 | 4/1997 | Takaba et al. | 396/6 |
| 5,630,192 | 5/1997 | Kobayashi | 396/513 |

*Primary Examiner*—Eddie C. Lee
*Attorney, Agent, or Firm*—Young & Thompson

[57] ABSTRACT

A lens-fitted photo film unit has a cassette containing chamber and a photo film roll chamber. The cassette containing chamber contains a cassette. The cassette has a spool and a cassette shutter. A photo film is secured to the spool contained in the cassette in a rotatable manner. The cassette shutter is incorporated in a rotatable manner between a closed position to block a photo film passage port and an open position to open the photo film passage port. The lens-fitted photo film unit has a rotatable photo film winding wheel, of which a wheel portion is disposed above the cassette containing chamber, and externally rotated after a frame on the photo film is exposed. A first rotational shaft projects downwards from the wheel portion, and is engaged with the spool through a top wall of the cassette containing chamber. The wheel portion is rotated to wind the photo film into the cassette. A rotating member has a second rotational shaft, is connected with the cassette shutter through the top wall of the cassette containing chamber, and rotates the cassette shutter from the open position to the closed position. Arc-like ridges project on the top wall of the cassette containing chamber, and support the wheel portion thereon. The wheel portion is located away from the top wall of the cassette containing chamber. The rotating member is contained between the wheel portion and the top wall at least partially.

9 Claims, 3 Drawing Sheets

LENS-FITTED PHOTO FILM UNIT WITH SUPPORTED FILM ADVANCE WHEEL

BACKGROUND OF THE INVENTION

1. Field of the Invention

The present invention relates to a lens-fitted photo film unit. More particularly, the present invention relates to a lens-fitted photo film unit in which a photo film winding wheel is prevented from being inclined while rotated for feeding photo film.

2. Description Related to the Prior Art

A lens-fitted photo film unit is constructed to have a simple mechanism for taking an exposure. The lens-fitted photo film unit has a housing pre-loaded with a photo film cassette of the 135 type (35 mm type). The housing is covered by an outer sheet having decorative printed patterns. The lens-fitted photo film unit is widely used as photographs can be taken conveniently by inexperienced users.

The housing of the lens-fitted photo film unit has a cassette containing chamber and a photo film roll chamber between which a light-shielding tunnel is located. The cassette containing chamber contains the cassette. The roll chamber contains a photo film roll. A cassette shell and the photo film roll constitute the cassette, of which a photo film has been drawn out of the cassette shell, and coiled as the photo film roll. There is a photo film winding wheel disposed on a top wall of the cassette containing chamber. A bottom of the winding wheel has a rotational shaft, which is inserted in a through hole in the top wall of the cassette containing chamber, and engaged with a spool of the cassette. When the winding wheel is rotated, the spool is rotated.

There is a newer photo film cassette, which is known as an IX240 type, or a type according to the "Advanced Photo System" (trademark). The cassette shell of the cassette is plastic, and has a photo film passage port where a cassette shutter is disposed instead of light-trapping fabric. The cassette shutter is rotatable between a closed position to close the photo film passage port light-tightly and an open position to open the photo film passage port. When a camera is loaded with the cassette, the cassette shutter is rotated to the open position by a mechanism in the camera. In removal of the cassette from the camera, the cassette shutter is rotated to the closed position.

The cassette of the IX240 type is characteristically small and lightweight, and favorable when used in the lens-fitted photo film unit. For the lens-fitted photo film unit containing the cassette, there is a suggestion of incorporating a cassette shutter rotating mechanism for rotating the cassette shutter. A bottom opening of the cassette containing chamber is closed by a bottom lid light-tightly. In response to opening movement of the bottom lid, the cassette shutter rotating mechanism operates to close the cassette shutter. This is effective in raising efficiency of removal of the cassette after use from the lens-fitted photo film unit.

In the IX240 type, the cassette shutter rotating mechanism includes a rotating member, a drive spring and a drive rod. The rotating member includes a rotational shaft and a lever portion. The rotational shaft is supported on the top wall of the cassette containing chamber axially, engaged with the top end of the cassette shutter, and is rotatable between the closed position where the cassette shutter closes the photo film passage port and the open position where the cassette shutter opens the photo film passage port. The lever portion is formed on the rotational shaft, and placed on the top wall of the cassette containing chamber. The drive spring biases the rotating member in a closing direction of the cassette shutter. The drive rod is slidable on a side of the cassette containing chamber, and includes a top end and a bottom end. The top end extends above the top wall of the cassette containing chamber, is engaged with the lever portion, and retains the rotating member in the open position of the cassette shutter against the spring bias. The bottom end is engaged with an engaging hook, which is formed with the bottom lid. When the bottom lid is opened, the drive rod is slid downwards to release the lever portion from retention. The rotating member is rotated in the closing direction by the bias of the drive spring, to close the cassette shutter.

It is conceivable in the lens-fitted photo film unit with the IX240 type that a sleeve is formed on the top wall of the cassette containing chamber for mounting the winding wheel. The rotational shaft at the bottom of the winding wheel is inserted through the sleeve and through the top wall, and is engaged with the top end of the spool. But the winding wheel is only supported by the sleeve, so that the winding wheel is likely to be unstable and inclined while mounted. It is probable that the rotating member or the drive spring is damaged in accidental contact with the winding wheel, typically when the winding wheel is rotated.

There is also a problem in that the silencer portion fails to reduce noise of the preventing claw during rotation of the winding wheel, particularly when the winding wheel is inclined away from the silencer portion.

SUMMARY OF THE INVENTION

In view of the foregoing problems, an object of the present invention is to provide a lens-fitted photo film unit in which a photo film winding wheel is prevented from being inclined while rotated for feeding photo film.

In order to achieve the above and other objects and advantages of this invention, a rotatable photo film winding wheel includes a wheel portion, disposed above the cassette containing chamber, and externally rotated after a frame is created on the photo film. A first rotational shaft is disposed to project downwards from the wheel portion, and engaged with the spool through a top wall of the cassette containing chamber, to wind the photo film into the cassette when the wheel portion is rotated. A rotating member has a second rotational shaft, and is connected with the cassette shutter through the top wall of the cassette containing chamber, for rotating the cassette shutter from the open position to the closed position. A first ridge is disposed to project on the top wall of the cassette containing chamber, for supporting the wheel portion thereon, so as to locate the wheel portion away from the top wall of the cassette containing chamber, the rotating member being contained at least partially in a space between the wheel portion and the top wall.

In a preferred embodiment, the rotating member further has a lever portion formed integrally with the second rotational shaft for rotating the second rotational shaft, and the lever portion is contained in the space at least partially.

First and second axial holes are formed through the top wall of the cassette containing chamber, for respectively supporting the first and second rotational shafts in a rotatable manner. The first ridge is disposed away from the first axial hole, and confronted with a region of the wheel portion near to a peripheral edge thereof.

There is a body in which the cassette containing chamber and the photo film roll chamber are formed, and to which the exposure mechanism is secured. Also, there is a front cover including a front portion and an upper portion, for respectively covering a front and a top of the body. At least one second ridge is disposed to project from the upper portion of the front cover toward the wheel portion, and in contact with the wheel portion, for preventing the wheel portion from moving upwards.

A plurality of teeth, are arranged on the peripheral edge of the wheel portion at a regular pitch. A preventing claw is formed integrally with the body, engaged with the teeth of the wheel portion, for preventing the wheel portion from rotating in reverse to winding the photo film. A silencer portion is disposed to project from the body toward the wheel portion, and in contact with a top of the wheel portion, for preventing the wheel portion from moving upwards, so as to reduce noise due to engagement of the preventing claw with the teeth.

In accordance with the present invention, a photo film winding wheel is prevented from being inclined while rotated for feeding photo film.

In any lens-fitted photo film unit, the periphery of the winding wheel has a plurality of teeth formed at a regular pitch for the purpose of frictional touch in a manual operation for rotation. A preventing claw is engaged with the teeth of the winding wheel, and inhibits the winding wheel from rotating in reverse to the winding. Furthermore a silencer portion is formed on the preventing claw to reduce noise created by vertical vibration of the preventing claw during rotation of the winding wheel. The silencer portion contacts a top face of the winding wheel, to absorb the vibration of the preventing claw in engagement of the preventing claw. A conventional construction has a problem in that the silencer portion fails to reduce noise of the preventing claw during rotation of the winding wheel, particularly when the winding wheel is inclined away from the silencer portion.

In the present invention, the winding wheel is prevented from being inclined away from the silencer portion, which can reduce noise of the preventing claw during rotation of the winding wheel.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
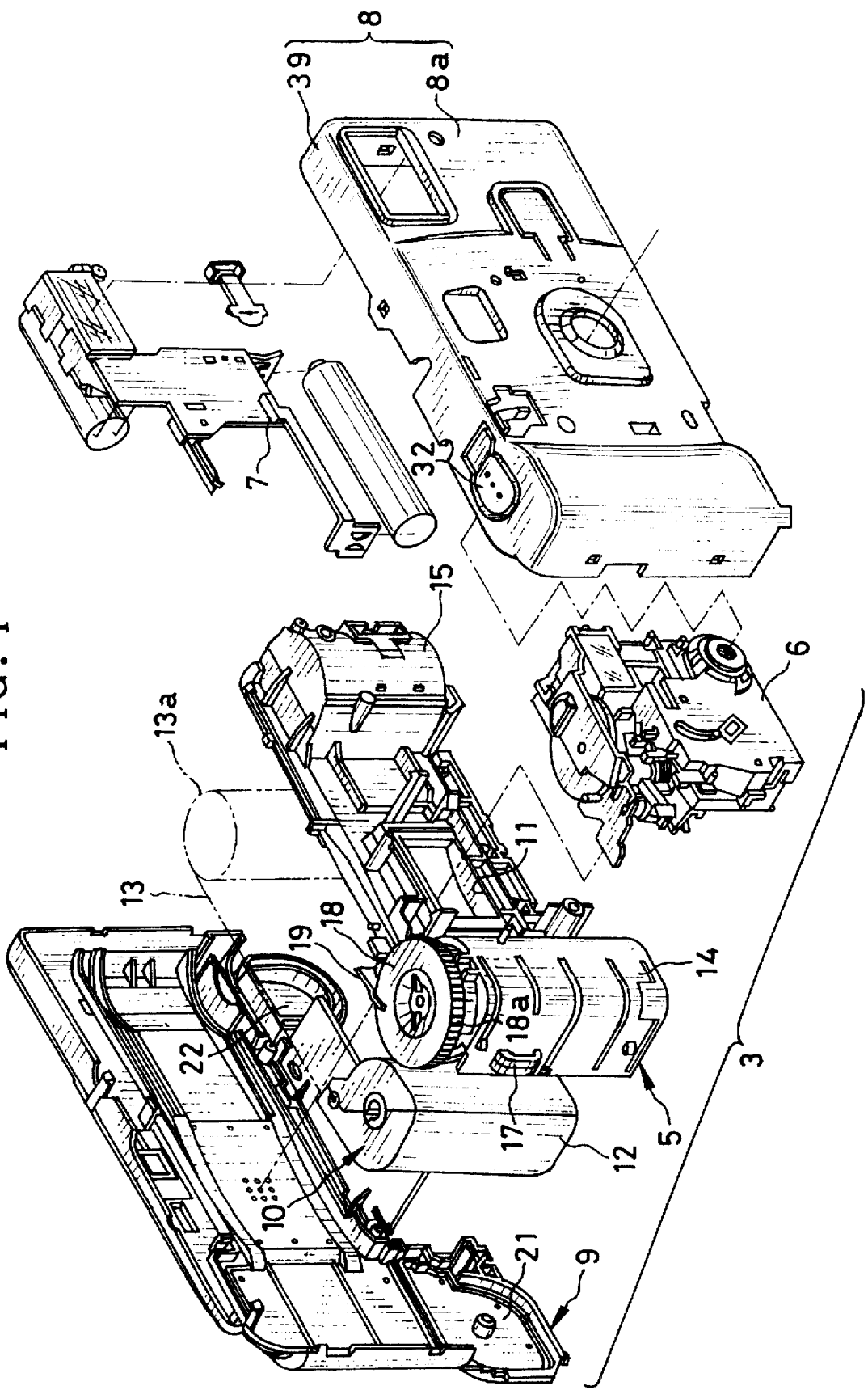
FIG. 1 is an exploded perspective illustrating a lens-fitted photo film unit.

In FIG. 1, a lens-fitted photo film unit has a housing 3, which consists of a body 5, an exposure unit 6, an electronic flash device 7, a front cover 8 and a rear cover 9. The body 5 is loaded with a cassette shell 12 and a photo film roll 13a. The cassette shell 12 and the photo film roll 13a constitute a photo film cassette 10, of which a photo film 13 is drawn out of the cassette shell 12, and coiled as the photo film roll 13a. The exposure unit 6 and the flash device 7 are mounted on the front of the body 5. The front cover 8 covers the front of the body 5, the exposure unit 6 and the flash device 7. The rear cover 9 covers the rear of the body 5. Those are fitted together in engagement of hooks.

At the center of the body 5, a light-shielding tunnel 11 is disposed to cover a photographic light path between the exposure unit 6 and a photo film 13. The exposure unit 6, including a one-frame feeding mechanism and a shutter mechanism, is mounted on the light-shielding tunnel 11. The body 5 has a cassette containing chamber 14 and a photo film roll chamber 15 between which the light-shielding tunnel 11 is located. The cassette containing chamber 14 contains the cassette shell 12. The roll chamber 15 contains the photo film roll 13a of the photo film 13 drawn from the cassette shell 12.

On a top wall 42 of the cassette containing chamber 14, a photo film winding wheel 18 is mounted in a rotatable manner. Around a wheel portion 18c of the winding wheel 18, there are arranged a plurality of teeth 18a formed at a regular pitch for the purpose of frictional touch in a manual operation for rotation in a counterclockwise direction. A preventing claw 19 is formed on the top wall 42 of the cassette containing chamber 14, is engaged with the teeth 18a of the winding wheel 18, and inhibits the winding wheel 18 from rotating in the clockwise direction in reverse to the winding direction.

The rear cover 9 is formed with a bottom lid 21 for the cassette containing chamber 14 and a bottom lid 22 for the roll chamber 15. When the rear cover 9 is fitted on the rear of the body 5 to close the cassette containing chamber 14 and the roll chamber 15 with the bottom lids 21 and 22, then the inside of the body 5 is shielded from ambient light. After the photo film cassette 10 is used, the bottom lids 21 and 22 are opened for removal of the cassette shell 12.

The front cover 8 covers the front and the top of the body 5. A grip portion is formed on a front portion 8a of the front cover 8 to follow an outer shape of the cassette containing chamber 14. A shutter release button 32 is formed with an upper portion 39 of the front cover 8.

When assembly of the parts of the housing 3 is finished, an outer sheet (not shown) is wound about the center of the housing 3 in a belt shape and fixed with adhesive agent. The outer sheet has decorative printed patterns. The engaging hooks of the front cover 8 and the rear cover 9, receiving engaged portions engaged with the engaging hooks, and holes adjacent to those portions, are located near to the center of the housing 3, and covered sufficiently by the outer sheet, so that the lens-fitted photo film unit can have neat and good appearance.

A hook or ring 17 is formed in a side face of the body 5 for securing a strap for manual holding. When the front cover 8 and the rear cover 9 are mounted on the body 5, the ring 17 emerges between edges of the front cover 8 and the rear cover 9. The strap, when secured to the ring 17, makes it convenient for a user to carry the lens-fitted photo film unit manually with him or her. It is to be noted that, instead of the ring 17, a hole may be formed in a position inward from a surface of the housing 3 for the purpose of securing the strap. This is favorable to avoiding incidentally obstructive touch of the ring 17 to the user taking a photograph.

Figure 2:
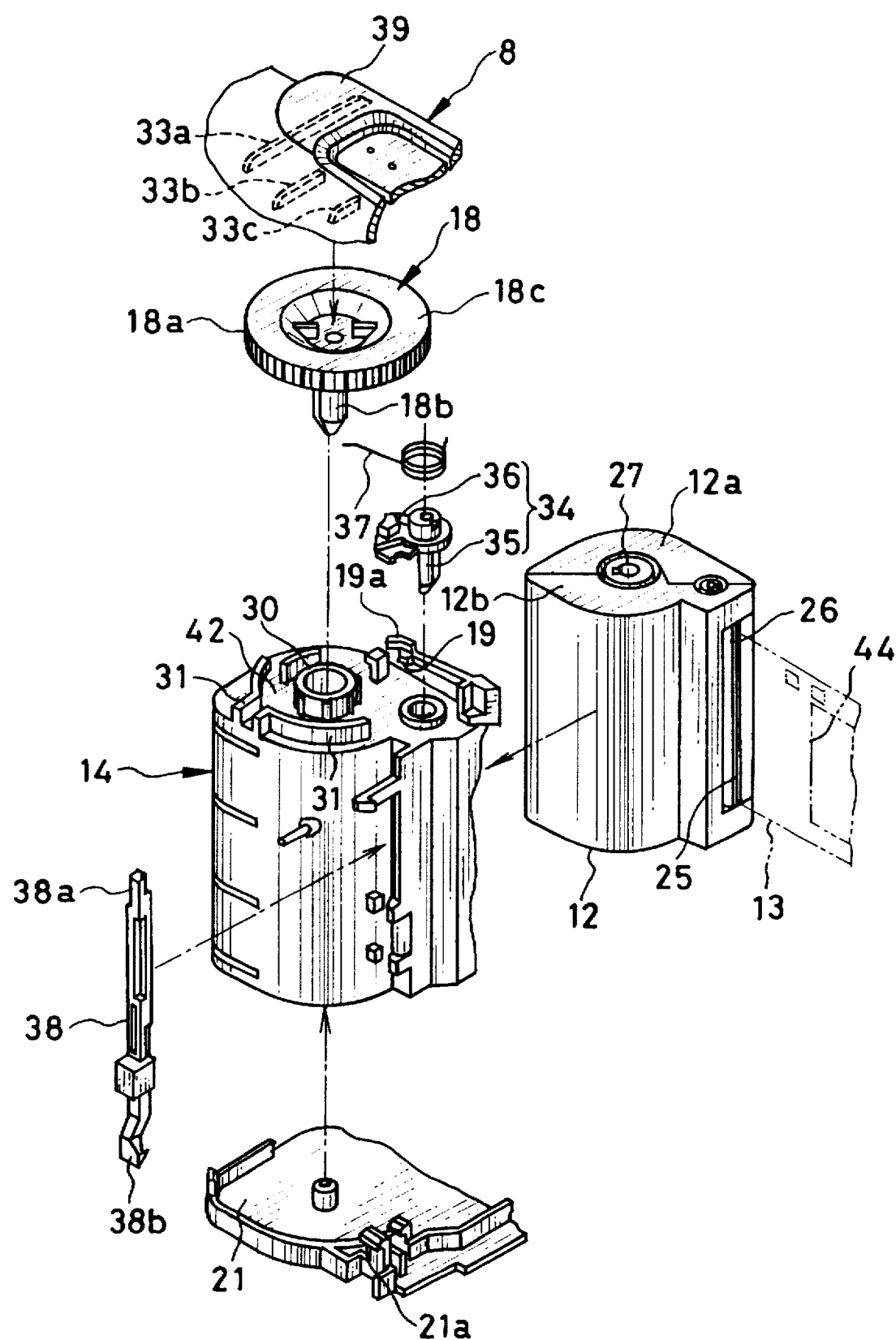
FIG. 2 is an exploded perspective illustrating a cassette containing chamber and its relevant structures of the lens-fitted photo film unit.
Figure 3:
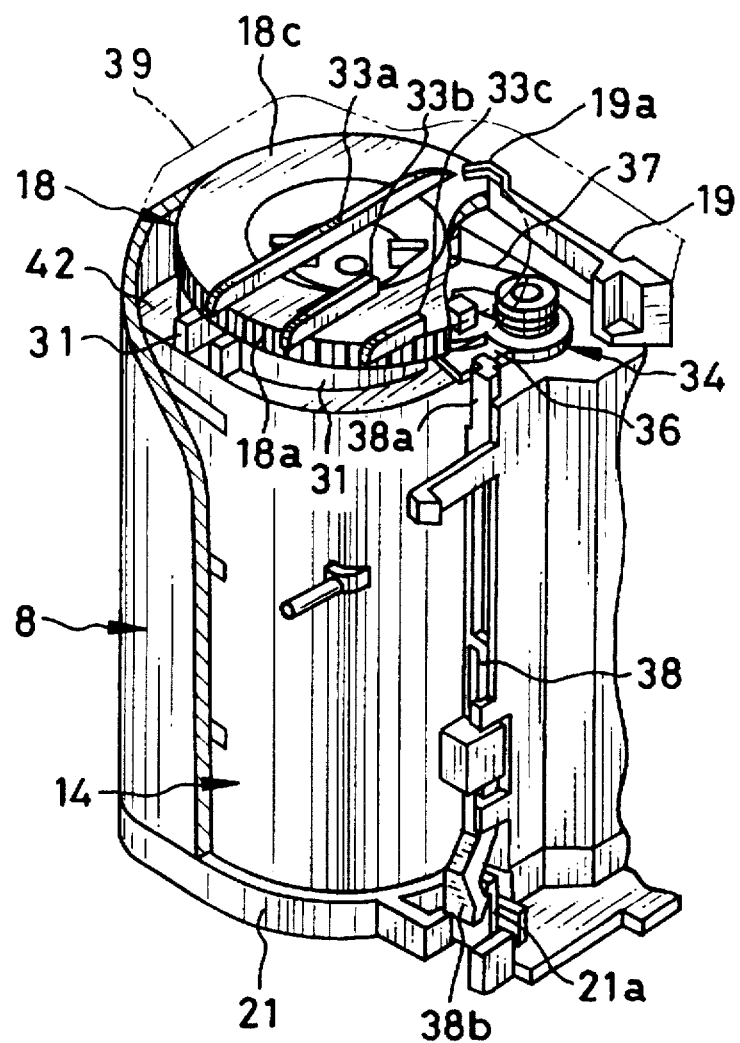
FIG. 3 is a perspective illustrating the cassette containing chamber and its relevant structures.

In FIGS. 2 and 3, structures relevant to the cassette containing chamber 14 are depicted. The photo film cassette 10 is an IX240 type disclosed in U.S. Pat. No. 4,978,985 (corresponding to JP-A 3-75741). The photo film cassette 10 includes the cassette shell 12, a cassette shutter 26, and a spool 27 with the photo filmstrip 13. The cassette shell 12 of the photo film cassette 10 is constituted of two shell halves 12a and 12b, is generally formed of opaque plastic of dark color, and has a photo film passage port 25 between the shell halves 12a and 12b. The cassette shutter 26 is rotatable between a closed position to close the photo film passage port 25 light-tightly and an open position to open the photo film passage port 25. The spool 27 is rotatable inside the cassette shell 12. A trailer end of the photo film 13 is secured to the spool 27. A reference numeral 44 designates a frame to be exposed on the photo film 13.

To rotate the cassette shutter 26 to the closed position in response to an opening operation of the bottom lid 21, a cassette shutter rotating mechanism includes a rotating member 34, a drive spring 37 and a drive rod 38. The rotating member 34 includes a rotational shaft 35 and a lever portion 36. The rotational shaft 35 is supported on the top wall 42 of the cassette containing chamber 14 axially, engaged with the top end of the cassette shutter 26, and is rotatable between the closed position where the cassette shutter 26 closes the photo film passage port 25 and the open position where the cassette shutter 26 opens the photo film passage port 25. The lever portion 36 is formed on the rotational shaft 35, and placed on the top wall 42 of the cassette containing chamber 14. The drive spring 37 biases the rotating member 34 toward the closed position of the cassette shutter 26. The drive rod 38 is slidable on a side of the cassette containing chamber 14, and includes a top end 38a and a bottom end 38b. The top end 38a extends above the top wall 42 of the cassette containing chamber 14, is engaged with the lever portion 36, and retains the rotating member 34 in the open position of the cassette shutter 26 against the spring bias. The bottom end 38b is engaged with an engaging hook 21a, which is formed with the bottom lid 21.

When the bottom lid 21 is opened, the drive rod 38 is slid downwards to release the lever portion 36 from retention. The rotating member 34 is rotated to the closed position by the bias of the drive spring 37, to close the cassette shutter 26.

On the top wall 42 of the cassette containing chamber 14 is formed a sleeve 30 for mounting the winding wheel 18. After mounting the rotating member 34 and the drive spring 37 on the top wall 42, the winding wheel 18 is placed in sleeve 30 to be rotatable. The rotating member 34 and the drive spring 37 are arranged in a gap between the top wall 42 of the cassette containing chamber 14 and a bottom face of the winding wheel 18. A rotational shaft 18b is formed on the bottom of the wheel portion 18c of the winding wheel 18, is inserted through the sleeve 30 and through the top wall 42, and is engaged with the top end of the spool 27.

The winding wheel 18 in a conventional lens-fitted photo film unit is only supported by the sleeve 30, so that the winding wheel 18 is likely to be inclined and interfere with the rotating member 34 or the drive spring 37. In the present invention, there are arc-like ridges 31 formed on the top wall 42 of the cassette containing chamber 14 for supporting the bottom face of the winding wheel 18. The arc-like ridges 31 prevent the winding wheel 18 from being inclined when the winding wheel 18 is manually operated. The rotating member 34 and the drive spring 37 are at least partially contained in the space between the top wall 42 and the winding wheel 18 by virtue of the arc-like ridges 31. The winding wheel 18 partially covers the rotating member 34 and the drive spring 37, which can be prevented from dropping away. Even when the rear cover 9 is placed, incidental vibration or shock does not displace the rotating member 34 or the drive spring 37. It is possible at a low cost to form the arc-like ridges 31, as the arc-like ridges 31 are formed with the cassette containing chamber 14 by to injection molding. Also, the arc-like ridges 31 reinforce the top wall 42 of the cassette containing chamber 14, and heighten resistance of the top wall 42 against breakage.

To reduce noise created by vertical vibration of the preventing claw 19 during rotation of the winding wheel 18, a silencer portion 19a is formed on the preventing claw 19. The silencer portion 19a contacts the top face of the winding wheel 18, to absorb the vibration of the preventing claw 19 in engagement of the preventing claw 19.

When the winding wheel 18 is rotated, the winding wheel 18 is likely to move upwards due to vibration. Noise is likely to occur when the silencer portion 19a comes away from the top of the winding wheel 18. To prevent such an unwanted situation, an inner surface of the upper portion 39 of the front cover 8 is formed with ridges 33a–33c for contact with the top face of the winding wheel 18. Lowest points of the ridges 33a–33c are set off from the horizontal top face of the winding wheel 18 at a distance of 0.1 mm. The ridges 33a–33c limit the upward shift of the winding wheel 18. The winding wheel 18 is supported between the arc-like ridges 31 and the ridges 33a–33c in the rotatable manner.

The operation of the above construction is described now. In a rotational operation of the winding wheel 18, force is applied to the winding wheel 18 in a direction to incline the wheel portion 18c. The bottom face of the winding wheel 18 is supported by the arc-like ridges 31 formed on the top wall 42, and kept from being inclined. This is effective in preventing the winding wheel 18 from contacting the rotating member 34 during the rotational operation.

Also, the ridges 33a–33c contact the top of the winding wheel 18, which is prevented from moving upwards. This makes it reliable to bring the silencer portion 19a of the preventing claw 19 in contact with the top face of the winding wheel 18. Noise due to vibration of the preventing claw 19 is suppressed. The winding wheel 18 does not have excessive vertical play while supported by the arc-like ridges 31 and the ridges 33a–33c. Thus the winding wheel 18 has good operability. Also, the upper portion 39 is supported by the virtue of the ridges 33a–33c contacting the winding wheel 18.

In the above embodiment, the photo film 13 is pre-drawn from the cassette 10, and an exposure is taken each time of winding back into the cassette 10. The present invention is applicable to a lens-fitted photo film unit in which an exposure is taken on the photo film 13 each time of unwinding from the cassette 10.

In the above embodiment, the winding wheel 18 partially covers the top of the lever portion 36 and partially covers the top of the rotational shaft 35. Of course the present invention is applicable to such constructions that the winding wheel 18 covers only the lever portion 36 and not the rotational shaft 35, and that the winding wheel 18 covers only the rotational shaft 35 and not the lever portion 36. Covering of the rotational shaft 35 or the lever portion 36 may be either partial or entire. In short, the feature of the present invention lies in that at least one of the lever portion 36 and the rotational shaft 35 is covered by the winding wheel 18 at least partially.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, having a cassette containing chamber, a photo film roll chamber, and an exposure mechanism, said cassette containing chamber containing a cassette, said photo film roll chamber containing a photo film drawn from said cassette, said exposure mechanism creating a frame on said photo film, said cassette having a spool and a cassette shutter, one end of said photo film being secured to said spool, said spool being contained in said cassette in a rotatable manner, said cassette shutter being incorporated in a rotatable manner between a closed position to close a photo film passage port and an open position to open said photo film passage port, said lens-fitted photo film unit comprising:

a rotatable photo film winding device, comprising:

a manually rotatable wheel, disposed above said cassette containing chamber, wherein said manually rotatable wheel is manually rotated after said frame is created on said photo film;

a first rotational shaft, disposed to project downwards from said manually rotatable wheel, and engaged with said spool through a top wall of said cassette containing chamber, to wind said photo film into said cassette when said manually rotatable wheel is rotated;

a rotating member, having a second rotational shaft, connected with said cassette shutter through said top wall of said cassette containing chamber, for rotating said cassette shutter from said open position to said closed position;

a body, in which said cassette containing chamber and said photo film roll chamber are formed, and to which said exposure mechanism is secured;

a front cover, including a front portion and an upper portion, for respectively covering a front and a top of said body; and at least one upper ridge, integrally formed on an inside of said upper portion of said front cover, wherein said at least one ridge contacts said manually rotatable wheel, preventing said manually rotatable wheel from moving upwards past a lower edge of said at least one upper ridge.

2. A lens-fitted photo film unit as defined in claim 1, wherein said rotating member further has a lever portion formed integrally with said second rotational shaft for rotating said second rotational shaft, and said lever portion is contained in said space at least partially.

3. A lens-fitted photo film unit as defined in claim 2, further comprising first and second axial holes, formed through said top wall of said cassette containing chamber, for respectively supporting said first and second rotational shafts in a rotatable manner;

wherein said lower ridge is disposed away from said first axial hole, and confronted with a region of said manually rotatable wheel near a peripheral edge thereof.

4. A lens-fitted photo film unit as defined in claim 3, further comprising:

a plurality of teeth, arranged on said peripheral edge of said manually rotatable wheel at a regular pitch;

a preventing claw, formed integrally with said body, engaged with said teeth of said manually rotatable wheel, for preventing said manually rotatable wheel from rotating opposite to a direction advancing said photo film; and a silencer portion, disposed to project from said body toward said manually rotatable wheel, and in contact with a top of said wheel portion, for preventing said wheel portion from moving upwards, so as to reduce noise due to engagement of said preventing claw with said teeth.

5. A lens-fitted photo film unit as defined in claim 4, wherein said silencer portion is formed to project from said preventing claw.

6. A lens-fitted photo film unit as defined in claim 4, further comprising a sleeve located on said top wall of said cassette containing chamber to project from an edge of said first axial hole, said manually rotatable wheel being mounted on said sleeve.

7. A lens-fitted photo film unit as defined in claim 4, further comprising:

a bottom opening formed under said cassette containing chamber;

a bottom lid for closing said bottom opening of said cassette containing chamber containing said cassette; and a drive mechanism, disposed between said bottom lid and said lever portion of said rotating member, for driving said lever portion in a direction to rotate said cassette shutter toward said closed position upon opening said bottom lid.

8. A lens-fitted photo film unit as defined in claim 1, further comprising a lower ridge, extending from said top wall of said cassette containing chamber toward said manually rotatable wheel and supporting said manually rotatable wheel, said rotating member being at least partially contained in a space between said manually rotatable wheel and said top wall.

9. A lens-fitted photo film unit as defined in claim 8, wherein a vertical limit of travel of the manually rotatable wheel between the at least one upper ridge and the lower ridge is 0.1 mm or less.

* * * * *